(12) United States Patent
Castelloe

(10) Patent No.: US 8,762,644 B2
(45) Date of Patent: Jun. 24, 2014

(54) LOW-POWER AUDIO DECODING AND PLAYBACK USING CACHED IMAGES

(75) Inventor: Michael Warren Castelloe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 13/034,910

(22) Filed: Feb. 25, 2011

(65) Prior Publication Data

US 2012/0096223 A1 Apr. 19, 2012

Related U.S. Application Data

(60) Provisional application No. 61/393,495, filed on Oct. 15, 2010.

(51) Int. Cl.
  *G06F 12/00* (2006.01)
  *G10L 19/00* (2013.01)
  *G10L 21/00* (2013.01)

(52) U.S. Cl.
  USPC ...... 711/118; 711/154; 711/E12.02; 704/500; 704/503; 704/E19.001

(58) Field of Classification Search
  None
  See application file for complete search history.

(56) References Cited

U.S. PATENT DOCUMENTS

| | | | | |
|---|---|---|---|---|
| 5,634,073 A | * | 5/1997 | Collins et al. | 710/5 |
| 5,713,006 A | * | 1/1998 | Shigeeda | 711/170 |
| 6,041,400 A | * | 3/2000 | Ozcelik et al. | 712/35 |
| 6,370,631 B1 | * | 4/2002 | Dye | 711/170 |
| 6,622,208 B2 | | 9/2003 | North | |
| 6,697,923 B2 | | 2/2004 | Chen | |
| 6,717,577 B1 | * | 4/2004 | Cheng et al. | 345/419 |
| 6,754,784 B1 | * | 6/2004 | North et al. | 711/145 |
| 7,827,356 B2 | | 11/2010 | Venkumahanti et al. | |
| 2002/0057898 A1 | * | 5/2002 | Normile | 386/111 |
| 2002/0118206 A1 | * | 8/2002 | Knittel | 345/557 |
| 2002/0166018 A1 | * | 11/2002 | Kim | 710/260 |
| 2003/0046510 A1 | * | 3/2003 | North | 711/203 |
| 2004/0220753 A1 | * | 11/2004 | Tabe | 702/32 |
| 2006/0013218 A1 | * | 1/2006 | Shore et al. | 370/389 |
| 2006/0026629 A1 | * | 2/2006 | Harris et al. | 725/32 |
| 2006/0200697 A1 | * | 9/2006 | Ito | 714/6 |
| 2006/0268124 A1 | * | 11/2006 | Fishman et al. | 348/231.99 |
| 2007/0113043 A1 | * | 5/2007 | Khan et al. | 711/203 |

(Continued)

FOREIGN PATENT DOCUMENTS

| | | | | |
|---|---|---|---|---|
| JP | 2007-104220 A | * | 4/2007 | G06T 1/00 |
| WO | 0157872 A1 | | 8/2001 | |
| WO | WO2008103854 | | 8/2008 | |

OTHER PUBLICATIONS

Lee, H.H.S. "Improving Energy and Performance of Data Cache Architectures by Exploiting Memory Reference Characteristics." University of Michigan, 2001.*

(Continued)

*Primary Examiner* — Matthew Bradley
*Assistant Examiner* — Daniel Bernard
(74) *Attorney, Agent, or Firm* — Espartaco Diaz Hidalgo

(57) ABSTRACT

A particular method includes loading one or more memory images into a multi-way cache. The memory images are associated with an audio decoder, and the multi-way cache is accessible to a processor. Each of the memory images is sized not to exceed a page size of the multi-way cache.

44 Claims, 9 Drawing Sheets

(56) References Cited

U.S. PATENT DOCUMENTS

| | | |
|---|---|---|
| 2007/0113050 A1 | 5/2007 | Knoth |
| 2007/0294738 A1* | 12/2007 | Kuo et al. ............ 725/116 |
| 2007/0299672 A1* | 12/2007 | Wang et al. ........... 704/500 |
| 2008/0055119 A1 | 3/2008 | Sadowski |
| 2008/0201716 A1* | 8/2008 | Du et al. ............. 718/104 |
| 2008/0250270 A1* | 10/2008 | Bennett .............. 714/6 |
| 2009/0006756 A1 | 1/2009 | Donley |
| 2010/0191536 A1* | 7/2010 | Sampat et al. ......... 704/500 |
| 2010/0198936 A1* | 8/2010 | Burchard et al. ....... 711/154 |
| 2012/0233405 A1* | 9/2012 | Budagavi ............. 711/118 |

OTHER PUBLICATIONS

Purser, Z.R. "Slipstream Processors." North Carolina State University, Raleigh, 2003.*

International Search Report and Written Opinion—PCT/US2011/056447—ISA/EPO—Jan. 24, 2012.

Seo, Euiseong, et al., "Exploiting Temporal Locality for Energy Efficient Memory Management", Journal of Circuits, Systems and Computers, Mar. 18, 2008, 13 pp.

* cited by examiner

LOW-POWER AUDIO DECODING AND PLAYBACK USING CACHED IMAGES

I. CLAIM OF PRIORITY

The present application claims priority from U.S. Provisional Patent Application No. 61/393,495 filed on Oct. 15, 2010, the contents of which are expressly incorporated herein by reference in their entirety.

II. FIELD

The present disclosure is generally related audio decoding and playback.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

Computing devices such as wireless telephones may have the ability to decode and play multiple kinds of audio streams. In certain scenarios, this may include decoding and playing different kinds of audio streams in concurrent fashion. Each time a type or number of audio streams being processed changes, the computing device may expend power resources (e.g., battery life) to reconfigure audio signal processing at the computing device.

IV. SUMMARY

Decoding and playing back audio streams at an electronic device may involve the use of a processor, such as an audio digital signal processor (DSP). In an effort to expedite operations at the audio DSP, the audio DSP may be coupled to a cache. However, the cache may be too small to accommodate all of the required data, instructions, and dynamic memory allocations for the audio decoding and playback process. Moreover, even if the cache is large enough to accommodate all of this information, the information may not be aligned so as to properly fit into the cache. As a result, cache misses may occur during audio decoding and playback. For example, cache misses may occur when switching from one audio decoder to another. Since cache misses may result in loading of new data into the cache, cache misses may increase power usage at the audio DSP (e.g., power usage due to retrieving data from other memory and writing the data to the cache). In addition, some systems may configure internal memory as cache or convert cache to tightly coupled memory (TCM). For example, such configuration and conversion may occur when concurrently processing multiple audio streams or when transitioning from concurrent processing to single processing. These operations may cause undesirable audible interruptions (e.g. "popping" noises) during audio playback. Thus, reducing or eliminating cache misses and memory conversions during audio decoding and playback may reduce power consumption at an electronic device and provide for a more pleasant user experience.

The present disclosure describes systems and methods to perform low-power decoding and playback using cached images (e.g., memory images). In one configuration, a processor has access to a multi-way (e.g., 4-way) cache. Data from other higher-level memory (e.g., RAM) may be loaded into the multi-way cache. When a low-power decoding and playback scenario is detected, one or more memory images may be loaded from the RAM to the multi-way cache. Each memory image may be sized and aligned in the RAM such that the memory image fits within a single cache page when loaded into the multi-way cache. The loaded memory images may include data, instructions, and dynamic memory allocation areas specific to a particular audio decoder. During loading of the memory images, although audio playback may generate some cache misses, audio playback may not stall or produce audible artifacts. Upon loading of the memory images into the cache, decoding and playback of an audio stream may be performed without cache misses at the multi-way cache and without further accesses to the RAM, thereby conserving power.

The present disclosure also describes systems and methods of dynamic memory management that may be used in conjunction with such low-power decoding and playback scenarios. For example, one of the memory images loaded to the multi-way cache to enable low-power decoding and playback may be a dynamic memory allocation region that is managed using the dynamic memory management techniques disclosed herein. Managing the dynamic memory allocation area may include dividing the allocated region into predetermined buffers of predetermined sizes and using a bitmask to indicate whether buffers of particular sizes are available.

In a particular embodiment, a method includes loading one or more memory images associated with an audio decoder to a multi-way cache. The multi-way cache is accessible to the processor. Each of the one or more images is sized to not exceed a page size of the multi-way cache.

In another particular embodiment, an electronic device includes a processor and a multi-way cache accessible to the processor. The processor is configured to load one or more memory images associated with an audio decoder into the multi-way cache. Each of the one or more memory images is sized not to exceed a page size of the multi-way cache.

In another particular embodiment, a method includes determining, based on a bitmask, whether at least one buffer is available to satisfy a requested buffer size. A first bit of the bit mask indicates whether a buffer having a first buffer size is available. A second bit of the bitmask indicates whether a buffer having a second buffer size is available.

Particular advantages provided by at least one of the disclosed embodiments include an ability to decode and playback one or more audio streams with reduced power usage.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
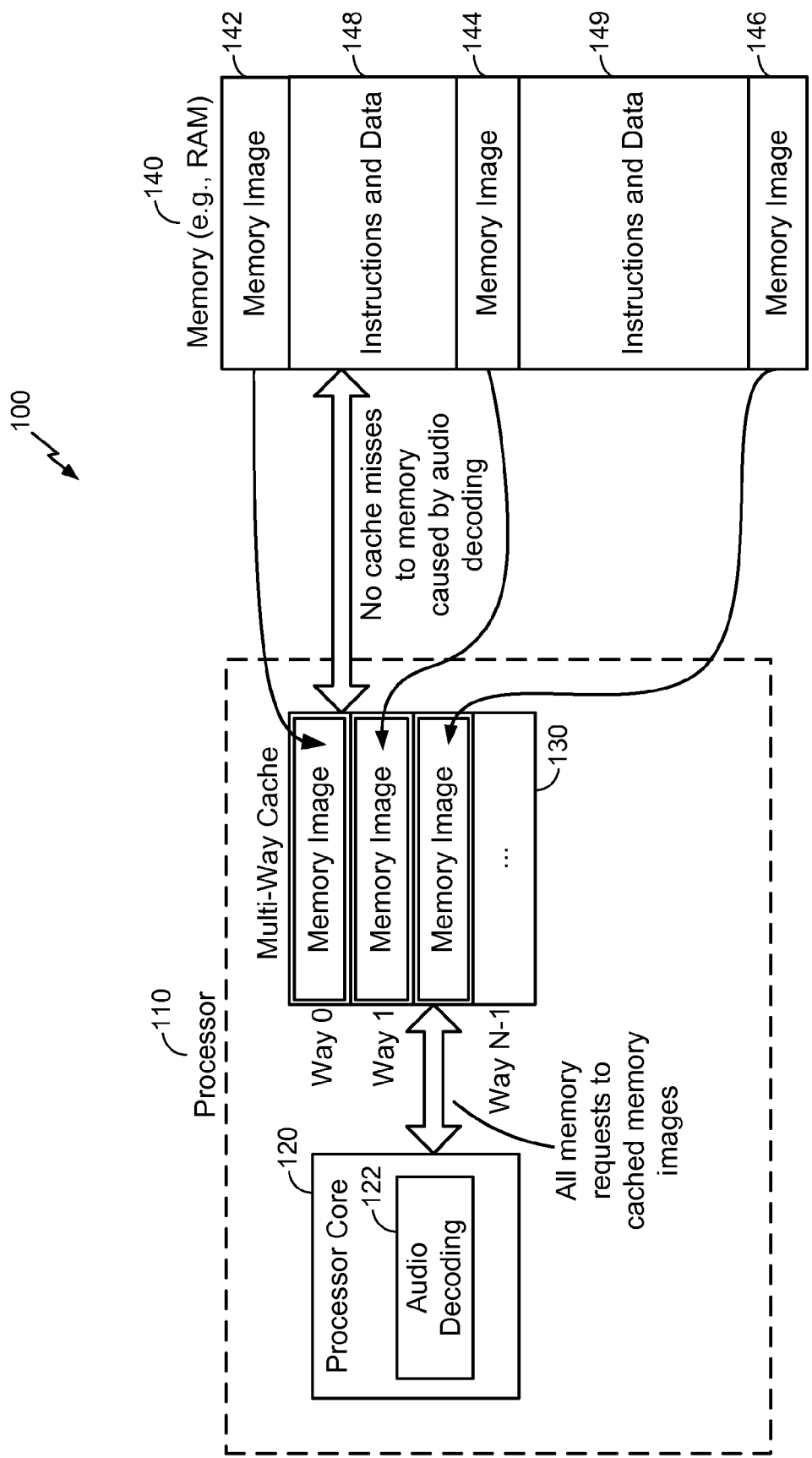
FIG. 1 is a block diagram to illustrate a particular embodiment of a system to perform low-power audio decoding and playback using cached images.

FIG. 1 is a block diagram to illustrate a particular embodiment of a system 100 to perform low-power audio decoding and playback using cached images. The system includes a processor 110 and a memory 140. The processor 110 may include a processor core 120 and a multi-way cache 130. During operation at the processor 110 (e.g., based on operation of the processor core 120), data may be loaded from the memory 140 to the multi-way cache 130. For example, the multi-way cache 120 may store data from portions of the memory 140 that are recently used or frequently used by the processor 110.

The processor 110 may be a general purpose processor or a digital signal processor (DSP). In a particular embodiment, the processor 110 is an audio DSP, and the processor core 120 includes one or more audio decoding blocks (e.g., illustrative audio decoding block 122). The audio decoding block 122 may include hardware circuitry and/or may execute software operable to decode particular types of audio streams. For example, the audio decoding block 122 may include implementations of an Advanced Audio Coding (AAC)-type audio decoder (e.g., AAC+), a Moving Picture Experts Group Audio Layer III (MP3)-type audio decoder, a speech audio decoder, a pulse-code modulation (PCM) audio decoder, other types of audio decoders, or any combination thereof.

The multi-way cache 130 may include a plurality of cache ways (e.g., "Way 0," "Way 1," ... "Way N–1" as illustrated in FIG. 1). For example, the multi-way cache 130 may be a 4-way cache that includes four cache ways, where each cache line of the 4-way cache includes four data elements, each associated with a different tag. Alternately, the multi-way cache 130 may include more than or less than four cache ways. In a particular embodiment, the multi-way cache 130 may be divided into pages (e.g., each cache way may correspond to a page) and may be operable to store data from the memory 140 in accordance with page-alignment boundaries of the memory 140. For example, the multi-way cache 130 may be a 256 kilobyte (kb) 4-way cache that can store up to four 64 kb pages from the memory 140.

The memory 140 may be a higher-level memory than the multi-way cache 130. For example, the memory 140 may be a random access memory (RAM) that is accessible to the processor 110. The memory 140 may provide more storage space than the multi-way cache 130 with increased latency when compared to the multi-way cache 130. In addition, use of the memory 140 by the processor 110 may involve additional power than usage of the multi-way cache 130. For example, use of the memory 140 may involve powering one or more data buses external to the processor 110.

In a particular embodiment, the memory 140 stores data in pages that have a page size substantially equal to the page size of the multi-way cache 130. For example, both the memory 140 and the multi-way cache 130 may have a page size of 64 kb. When the memory 140 and the multi-way cache 130 have equal page sizes, memory images (e.g., illustrative memory images 142, 144, and 146) that are aligned so as to be stored within a single page of the memory 140 may be loaded into a single page of the multi-way cache 130. For example, each of the memory images 142, 144, and 146 may be loaded into single pages of the multi-way cache 130, as illustrated in FIG. 1. In a particular embodiment, the memory images 142, 144 and 146 are associated with a particular audio decoder. Loading the memory images 142, 144, and 146 into the multi-way cache 130 may enable audio decoding without causing any cache misses at the multi-way cache 130 and without accessing the RAM 140. The memory 140 may also store instructions and data 148, 149 associated with other audio decoders and applications.

During operation, data may be loaded into the multi-way cache 130 in response to memory access requests (e.g., read and write requests) issued by the audio decoding block 122 of the processor core 120. When an access request corresponds to a memory address that is not cached in the multi-way cache 130, a cache miss may occur. In response to the cache miss, all or a portion of the page that includes the memory address may be loaded from the memory 140 into the multi-way cache 130. Alternately, if the access request corresponds to a memory address that is cached in the multi-way cache 130, the access request may be serviced without occurrence of a cache miss.

When each audio stream being decoded and played back at the system 100 is of the same type (e.g., only MP3 audio streams are being decoded and played back), the system 100 may be transitioned into a low-power decoding and playback mode. In the low-power mode, audio decoding instructions and data (e.g., MP3 decoder instructions and data stored at the memory images 142, 144, and 146) may be loaded from the memory 140 to the multi-way cache 130, so that all memory requests associated with processing the audio stream(s) correspond to the cached memory images at the multi-way cache 130 and no cache misses are caused by the processing of the audio streams.

It will be appreciated that the system 100 of FIG. 1 may enable low-power decoding and playback of audio streams. For example, the system 100 of FIG. 1 may load the memory images 142, 144, and 146 to the multi-way cache 130 to enable audio decoding without causing cache misses, thereby reducing an overall power consumption of the system 100. Thus, by sizing and aligning the memory images 142, 144, and 146 to correspond to a single cache page, application programmers and developers may enable low-power decoding and playback at the system 100 of FIG. 1. In addition, low power playback can be achieved without converting the multi-way cache 130 into a tightly-coupled memory (TCM) configuration that can cause audible effects during playback. Moreover, based on the size of the multi-way cache 130, low-power decoding may be extended to concurrent streams of different stream types. For example, a multi-way cache may have sufficient size to accommodate necessary memory images for both MP3 and AAC+, thereby enabling support for a low-power concurrent MP3 and AAC+ decoding and playback scenario. Low-power decoding and playback may also be extended to non-audio processing applications, such as ultrasound, graphics, and video.

Figure 2:
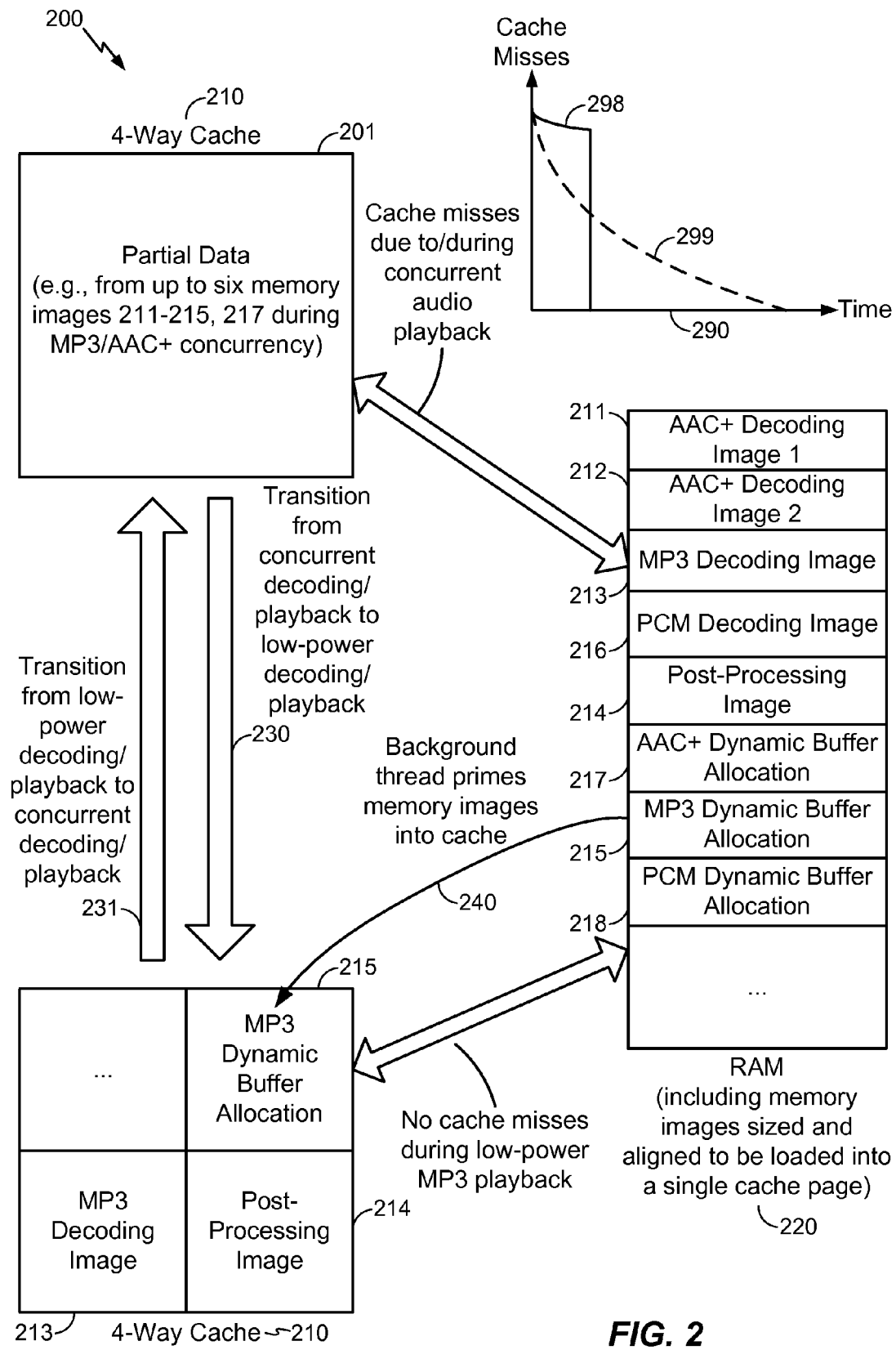
FIG. 2 is a block diagram to illustrate another particular embodiment of a system to perform low-power audio decoding and playback using cached images.

FIG. 2 is a block diagram to illustrate another particular embodiment of a system 200 to perform low-power audio decoding and playback using cached images. The system 200 includes a 4-way cache 210 and a RAM 220. In particular, the embodiment illustrated in FIG. 2 depicts a first transition 230 from a concurrent decoding and playback scenario to a low-power decoding and playback scenario, and a second transition 231 from the low-power decoding and playback scenario to the concurrent decoding and playback scenario.

The RAM 220 may store data associated with a plurality of audio decoders. For example, the RAM 220 may store decoding image(s) (e.g., decoding program instructions) and dynamic buffer allocation region(s) for each decoder. The RAM 220 may also store one or more memory images common to multiple decoders, such as post-processing image. Alternately, a different post-processing image may exist for each type of audio stream. In the particular embodiment illustrated in FIG. 2, the RAM 220 includes two AAC+ decoding images 211-212, an MP3 decoding image 213, a PCM decoding image 216, a post-processing image 214 applicable to all audio streams, an AAC+ dynamic buffer allocation region 217, an MP3 dynamic buffer allocation region 215, and a PCM dynamic buffer allocation region 218. It should be noted that the memory images 211-218 may be used for audio decoding and playback in both low-power mode as well as non low-power modes. The ability to use the same memory images for low-power and non low-power modes may conserve space in the RAM 220 by eliminating the requirement for specialized memory images that are usable only in low-power mode. It should also be noted that although the memory images 211-218 are sized and aligned so as to be loaded into a single page of the 4-way cache 210, memory images for audio decoders that are incompatible with low-power decoding may not sized and aligned as such.

In an initial configuration, the 4-way cache 210 may be used during decoding of concurrent streams having different stream types. For example, the 4-way cache 210 may be used while concurrently decoding one or more AAC+ streams and one or more MP3 streams, as illustrated in the upper portion of FIG. 2. To illustrate, the 4-way cache 210 may store partial data 201 that includes portions from up to six memory images that are used during concurrent processing of MP3 and AAC+ audio. The partial data 201 may include recently accessed portions of one or more of the memory images 211-215 and 217. Data from the PCM decoding image 216 or the PCM dynamic buffer allocation region 218 may not exist in the 4-way cache 210, because no PCM audio is being processed. Cache misses may occur during such concurrent processing. For example, AAC+ stream processing may include memory access requests to four memory images (the AAC+ decoding images 211-212, the AAC+ dynamic buffer allocation region 217, and the post-processing image 214) and MP3 stream processing may include memory access requests to three memory images (the MP3 decoding images 213, the MP3 dynamic buffer allocation region 215, and the post-processing image 214). Since the 4-way cache 210 cannot accommodate all six memory images in their entirety, the concurrent processing of AAC+ and MP3 streams may cause cache misses at the system 200.

During operation, upon termination of the AAC+ stream (s), the system 200 may undergo the first transition 230 into a low-power configuration as illustrated in the lower portion of FIG. 2. For example, the MP3 decoding image 213, the MP3 dynamic buffer allocation region 215, and the post-processing image 214 may coexist in the 4-way cache 210 in the low-power configuration. When all three of the images 213, 214, and 215 are cached at the 4-way cache 210, MP3 decoding and playback may occur without cache misses, thereby enabling low-power processing of MP3 streams. In addition, the low-power processing may be performed without audible interruption in the MP3 streams and without intervention from any processors external to the system 200 (e.g., application processors).

In a particular embodiment, the first transition 230 to the low-power configuration causes initiation of a process that loads memory images into the 4-way cache 210. For example, the first transition 230 may cause initiation of a background thread 240 of the system 200 that is operable to prime data from a particular memory page (i.e., a particular memory image) into cache lines of a particular cache page. The background thread 240 may be initiated and executed by a processor in response to detecting a start or a stop of an audio decoding process (e.g., the start or stop of audio streams).

When the background thread 240 is used to prime memory images into the 4-way cache 210, the number of cache misses generated during low-power decoding and playback may be represented by a first curve 298 of a graph 290. As illustrated by the first curve 298, the number of cache misses may decrease for a short period of time, while the memory images are being primed into the 4-way cache 210, and then become zero once the memory images are fully cached at the 4-way cache 210. The occurrence of cache misses when the background thread 240 is not used may be represented by a second curve 299. As illustrated by the second curve 299, the system 200 may take longer to reach zero cache misses when the background thread 240 is not used, which may involve greater power expenditure at the system 200.

Alternately, or in addition, the system 200 may undergo the second transition 231 from low-power MP3 processing to concurrent AAC+ and MP3 processing. The second transition 231 may be carried out without audible interruption. For example, while an MP3 decoder continues decoding the MP3 stream(s), an AAC+ decoder may be initiated. Portions of code, data, and a dynamic memory allocation for the AAC+ decoder (e.g., represented by the memory images 211, 212, and 217) may be accessed and cached at the 4-way cache 210. During concurrent processing, the 4-way cache 210 may store the partial data 201, where the partial data 201 may represent recently accessed portions of the MP3 memory images 213, 215, the AAC+ memory images 211, 212, 217, and the post-processing image 214. Although concurrently processing MP3 and AAC+ audio may cause cache misses, the fact that both the MP3 memory images 213, 215 and the AAC+ memory images 211, 212, 217 are aligned to the page size of the 4-way cache 210 may provide improved cache efficiency at the system 200.

Figure 3:
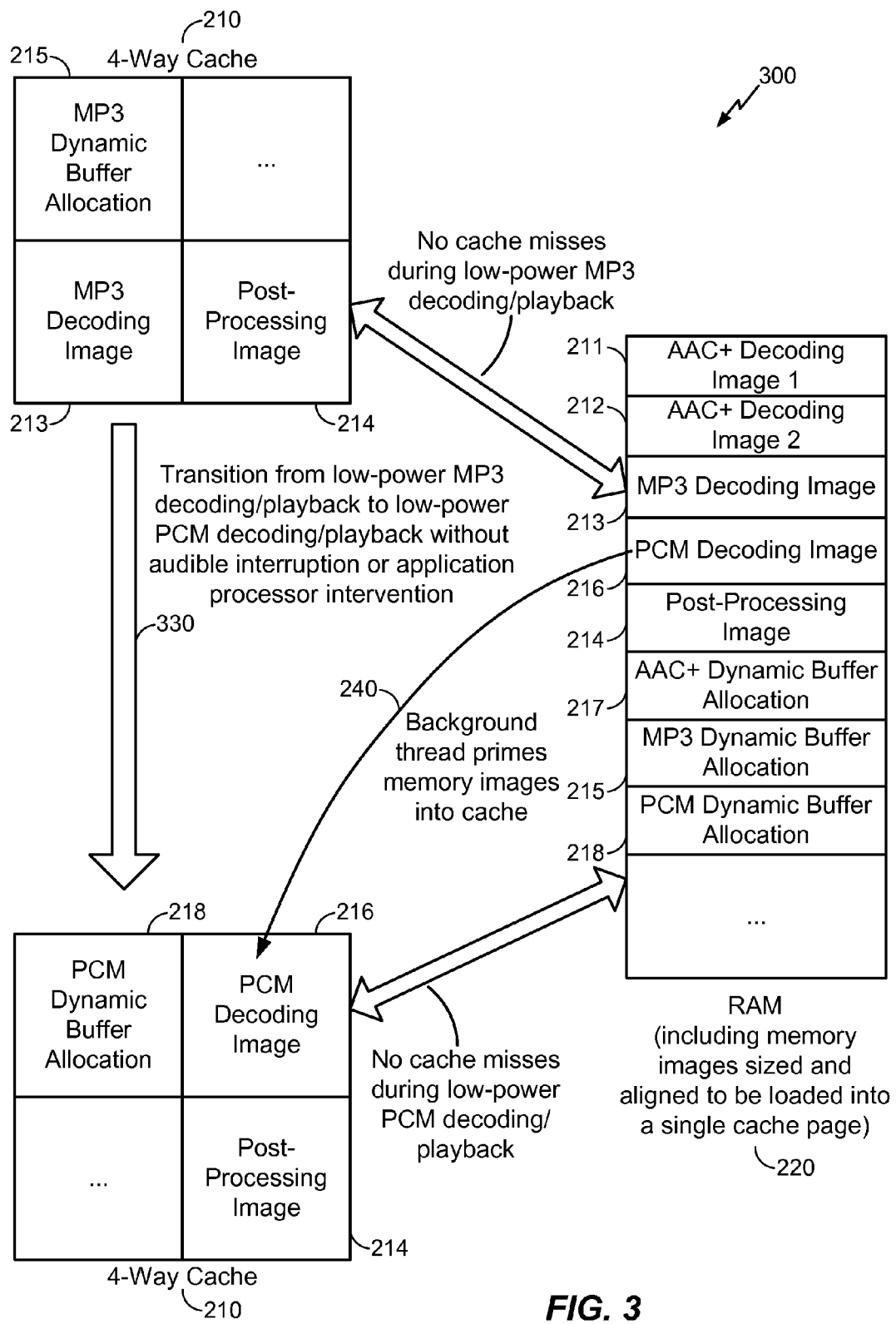
FIG. 3 is a block diagram to illustrate another particular embodiment of a system to perform low-power audio decoding and playback using cached images.

FIG. 3 is a block diagram to illustrate another particular embodiment of a system 300 to perform low-power audio decoding and playback using cached images. In particular, the embodiment illustrated in FIG. 3 depicts a transition 330 from a first low-power decoding and playback scenario to a second low-power decoding and playback scenario.

In an initial configuration, the 4-way cache 210 may be used during processing of one or more MP3 streams in a low-power mode, as illustrated in the upper portion of FIG. 3. For example low-power processing of MP3 streams may be achieved as described and illustrated with reference to FIG. 2.

During operation, the one or more MP3 streams may terminate and one or more PCM streams may begin. In response, the system 300 may transition 330 from the low-power MP3 processing mode to a low-power PCM processing mode, as illustrated in the lower portion of FIG. 3. For example, the post-processing image 214 may remain in the 4-way cache 210 while the PCM dynamic buffer allocation region 218 and the PCM decoding image 216 are primed into the 4-way cache 210 by the background thread 240. Once all three of the images 218, 216, and 214 are cached at the 4-way cache 210, PCM decoding and playback may occur without cache misses, thereby enabling low-power processing of PCM streams. In addition, the low-power processing may be performed without audible interruptions (e.g., "popping" noises) in the MP3 stream(s) or the PCM stream(s).

Figure 4:
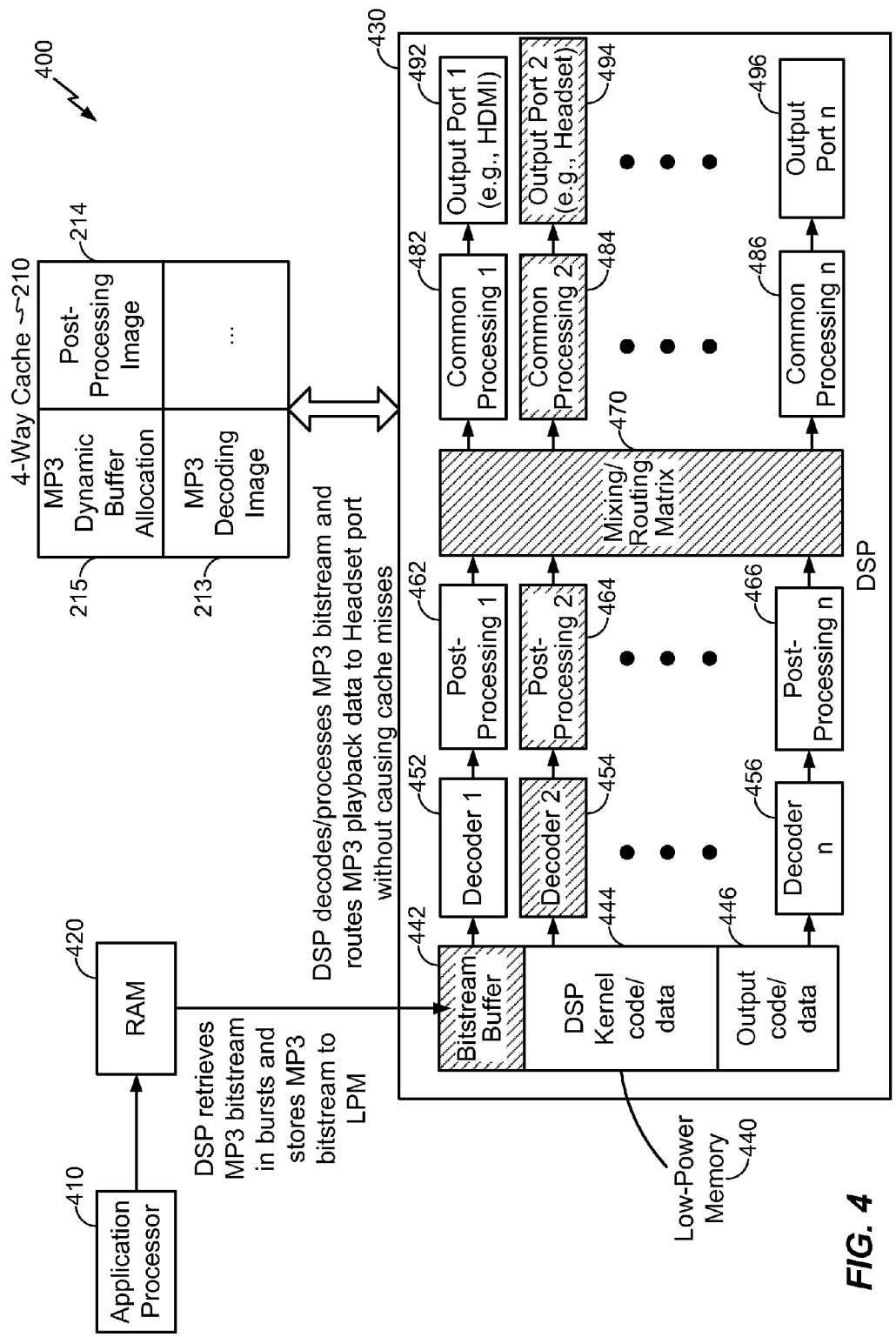
FIG. 4 is a block diagram to illustrate another particular embodiment of a system to perform low-power audio decoding and playback using cached images.

FIG. 4 is a block diagram to illustrate another particular embodiment of a system 400 to perform low-power audio decoding and playback using cached images. The system 400 includes an application processor 410 and a DSP 430 communicatively coupled to a RAM 420. The DSP 430 is also coupled to the 4-way cache 210. In an illustrative embodiment, the DSP 430 is the processor 110 of FIG. 1. In alternate embodiments, the 4-way cache 210 may be included within the DSP 210.

The application processor 410 may provide unprocessed audio bitstreams to the DSP 430. For example, the application processor 410 may place an unprocessed bitstream in the RAM 420 and may notify the DSP 430 of the unprocessed bitstream. In response, the DSP 430 may retrieve the unprocessed bitstream from the RAM 420.

In a particular embodiment, the DSP 430 includes or is coupled to a low-power memory (LPM) 440. For example, the LPM 440 may include a bitstream buffer 442, DSP kernel code and data 444, and output port (e.g., audio front-end port) code and data 446. The DSP kernel code and data 444 and the output port code and data 446 may include program instructions that are common to multiple audio decoders. In a particular embodiment, the LPM 440 functions as a complement to the 4-way cache 210. That is, low-power decoding and playback may involve usage of the 4-way cache 210 and the LPM 440 but not the RAM 420. The DSP 430 may retrieve the unprocessed bitstream from the RAM 420 in bursts (e.g., periodic retrieval of fixed-size or variable-size portions) and may store the unprocessed bitstream at the bitsteam buffer 442.

The DSP 430 may also include one or more decoders, post-processing circuitry, a mixing/routing matrix, common processing circuitry, and output ports. Each decoder (e.g., illustrative decoders, 452, 454, and 456) may be operative to receive data from the bitstream buffer 442, decode the received data to generate decoded data, and transmit the decoded data to a post-processing circuit (e.g., illustrative post-processing circuits 462, 464, and 466). Each post-processing circuit may apply one or more post-processing operations to the decoded data to generate post-processed data and transmit the post-processed data to a mixing and routing matrix 470. In a particular embodiment, the post-processing operations are specific to the type of decoder and audio stream. For example, MP3 post-processing operations may be distinct from PCM post-processing operations. Alternately, the post-processing operations may include operations that are common to multiple types of decoders and audio streams.

The matrix 470 may route the post-processed data to a common processing circuit (e.g., illustrative common processing circuits 482, 484, and 486). The common processing circuit may apply one or more common processing operations to the post-processed data to generate processed data that is ready for output. The common processing operations may be decoder-agnostic operations that are applied regardless of the type of bitstream being processed. The processed data may be output via an output port (e.g., illustrative output ports 492, 494, and 496). In an illustrative embodiment, each output port corresponds to a different output of the system 400. For example, the first output port 492 may correspond to an HDMI output and the second output port 494 may correspond to a headset output, as illustrated in FIG. 4.

Operation at the system 400 is described with reference to an exemplary use case—a user listening to an MP3 song via a headset output of a mobile phone. In certain situations (e.g., if no other audio streams or types of audio streams are being decoded), this use case may represent a low-power audio decoding and playback use case. The application processor 410 may place a bitstream corresponding to the MP3 song (or a portion thereof) in the RAM 420 and may notify the DSP 430 of the bitstream. In response, the DSP 430 may copy the bitstream from the RAM 420 to the bitstream buffer 442 of the LPM 440.

The MP3 bitstream may then be decoded, post-processed, mixed, common processed, and output via the headset output port 494, thereby enabling the user to listen to the MP3 song. During these operations, all memory accesses corresponding to MP3 processing may be serviced using the LPM 440 and the memory images 213, 214, and 215 at the 4-way cache 210. For example, the memory images 213, 214, and 215 may have been loaded to the 4-way cache 210 by a background thread, such as the background thread 240 of FIG. 2 at the start of MP3 processing.

It will be appreciated that a processing path from the bitstream buffer 442 to an output port, by using the 4-way cache 210 and the LPM 440 but not using the RAM 420, may represent a low-power decoding and playback use case. For example, the path from the bitstream buffer 442 to the headset output port 494 (denoted via shading in FIG. 4) may represent the low-power use case associated with decoding and playing back the MP3 song.

In a particular embodiment, the low-power use case may occur following a transition from a concurrent audio use case (e.g., as illustrated with reference to FIG. 2). For example, the audio decoder 452 may be decoding a speech audio stream generated by a phone call while the audio decoder 454 decodes the MP3 song. When the phone call ends, termination of the speech audio stream may be detected, and the audio decoder 452 may become inactive. However, since the MP3 song continues to play, the audio decoder 454 may continue to decode the MP3 song. Any of the memory images 213, 214, and 215 that are not already in the 4-way cache 210 may be loaded to the 4-way cache 210 without audible interruptions in the speech audio stream or the MP3 audio stream and without intervention from the application processor 410.

In another particular embodiment, the low-power use case may occur following a transition from another low-power use case (e.g., as illustrated with reference to FIG. 3). For example, the audio decoder 452 may be decoding (without cache misses) a speech audio stream generated by a phone call while the audio decoder 454 is inactive (e.g., since the user is not listening to an MP3 song). When the phone call ends, termination of the speech audio stream may be detected. Further, the user may enter a command to start playback of an MP3 song, causing initiation of an MP3 stream. In response, the memory images 213, 214, and 215 may be loaded to the 4-way cache 210 to enable low-power processing of the MP3 song without audible interruptions in the speech audio stream or the MP3 audio stream and without intervention from the application processor 410.

Figure 5:
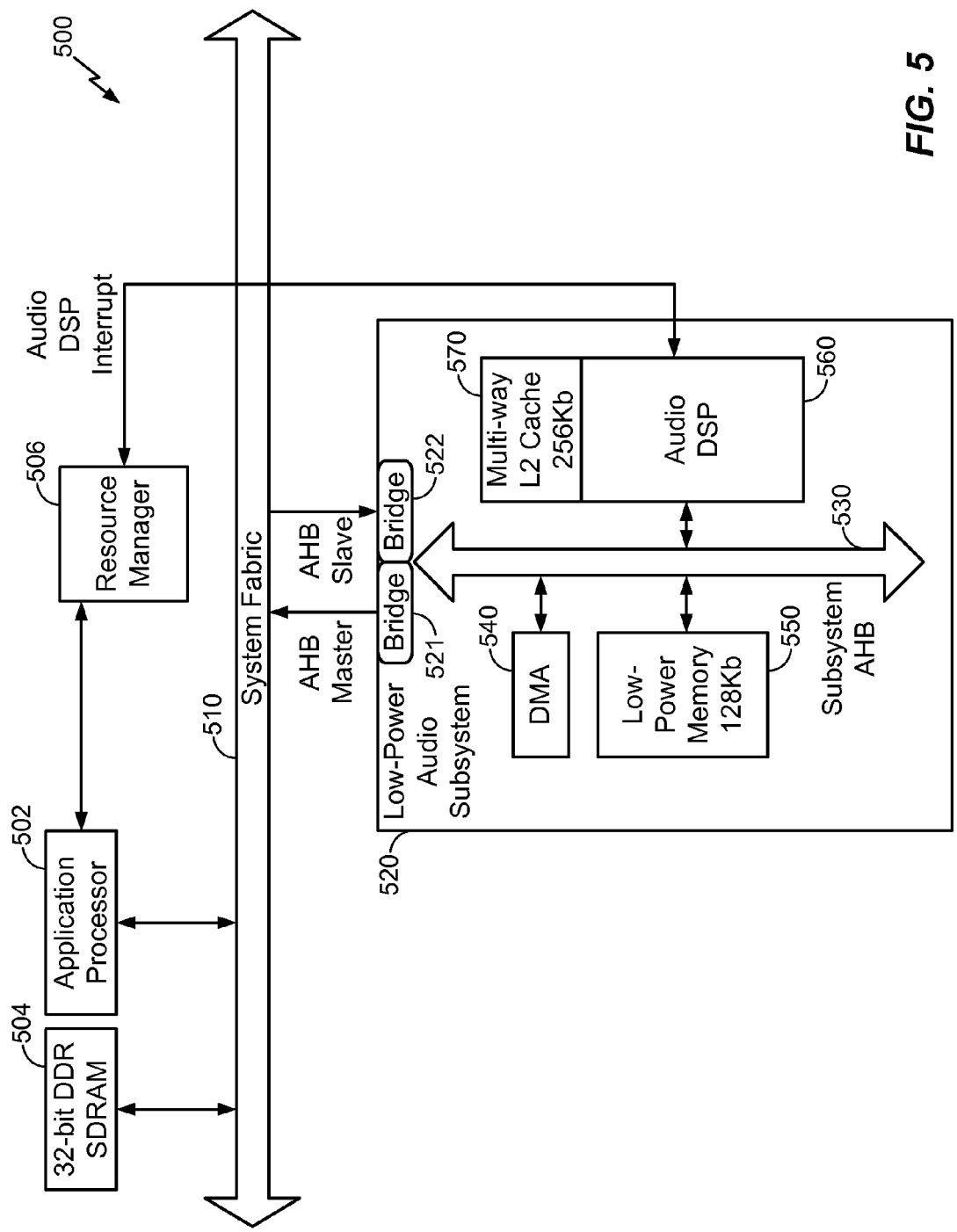
FIG. 5 is a diagram to illustrate another particular embodiment of a system to perform low-power audio decoding and playback using cached images.

FIG. 5 is a diagram to illustrate another particular embodiment of a system 500 to perform low-power audio decoding and playback using cached images. The system 500 includes an application processor 502, a memory 504, a resource manager 506, and a low-power audio subsystem (LPA-SS) 520 communicatively coupled to each other via a system fabric 510. In an illustrative embodiment, the application processor 502 is the application processor 410 of FIG. 4 and the memory 504 is the memory 140 of FIG. 1, the memory 220 of FIG. 2, or the RAM 420 of FIG. 4. In a particular embodiment, the memory 504 is 32-bit double data rate (DDR) synchronous dynamic random access memory (SDRAM).

The LPA-SS 520 may include an advanced high performance bus (AHB) 530 operable to communicate data between various components of the LPA-SS 520, such as an AHB master bridge 521, an AHB slave bridge 522, a DMA controller 540, a 128 kb LPM 550, and an audio DSP 560 coupled to a 256 kb multi-way L2 cache 570. In an illustrative embodiment, the LPM 550 is the LPM 440 of FIG. 4 and the cache 570 is the multi-way cache 130 of FIG. 1 or the 4-way cache 210 of FIG. 2. The audio DSP 560 may receive audio DSP interrupts from the resource manager 506. For example, the audio DSP interrupts may be generated by the application processor 502, audio input or output devices, or by some other interrupt source.

In operation, the application processor 502 may place an audio bitstream (e.g., an MP3 song) in the memory 504. The application processor 502 may also notify the audio DSP 560 of the bitstream (e.g., via an audio DSP interrupt issued by the resource manager 506). In response, the DMA controller 540 may load the bitstream from the memory 504 to the LPM 550. Alternately, the DMA controller 540 may periodically retrieve bursts of bitstreams from the memory 504 instead of relying on an interrupt-based mechanism. The audio DSP 560 may process the bitstream in the LPM 550 to generate output audio. When the LPA-SS 520 is in a low-power use case, all memory requests generated by the audio DSP 560 may be serviced by the LPM 550 or the cache 570 (e.g., using memory images loaded at the cache 570). It will be appreciated that during low-power use cases, power applied to the application processor 502, the memory 504, the resource manager 506, and the system fabric 510 may be reduced, thereby conserving power at the system 500. For example, one or more of the application processor 502, the memory 504, the resource manager 506, and the system fabric 510 may be put in a low-power or sleep mode or may be powered off.

Processing an audio stream may involve the use of dynamically allocated buffers. For example, as illustrated in FIGS. 2-4, one or more dynamic memory allocation regions may be cached in a multi-way cache during low-power decoding and playback. In a particular embodiment, the dynamic memory allocation region(s) represent a dynamic memory heap that is managed in accordance with a dynamic memory management technique illustrated by FIG. 6 and generally designated 600. The technique 600 may be used during low-power use cases as well as during non low-power use cases to achieve constant time (i.e., O(1)) allocation and deallocation of dynamic buffers.

Figure 6:
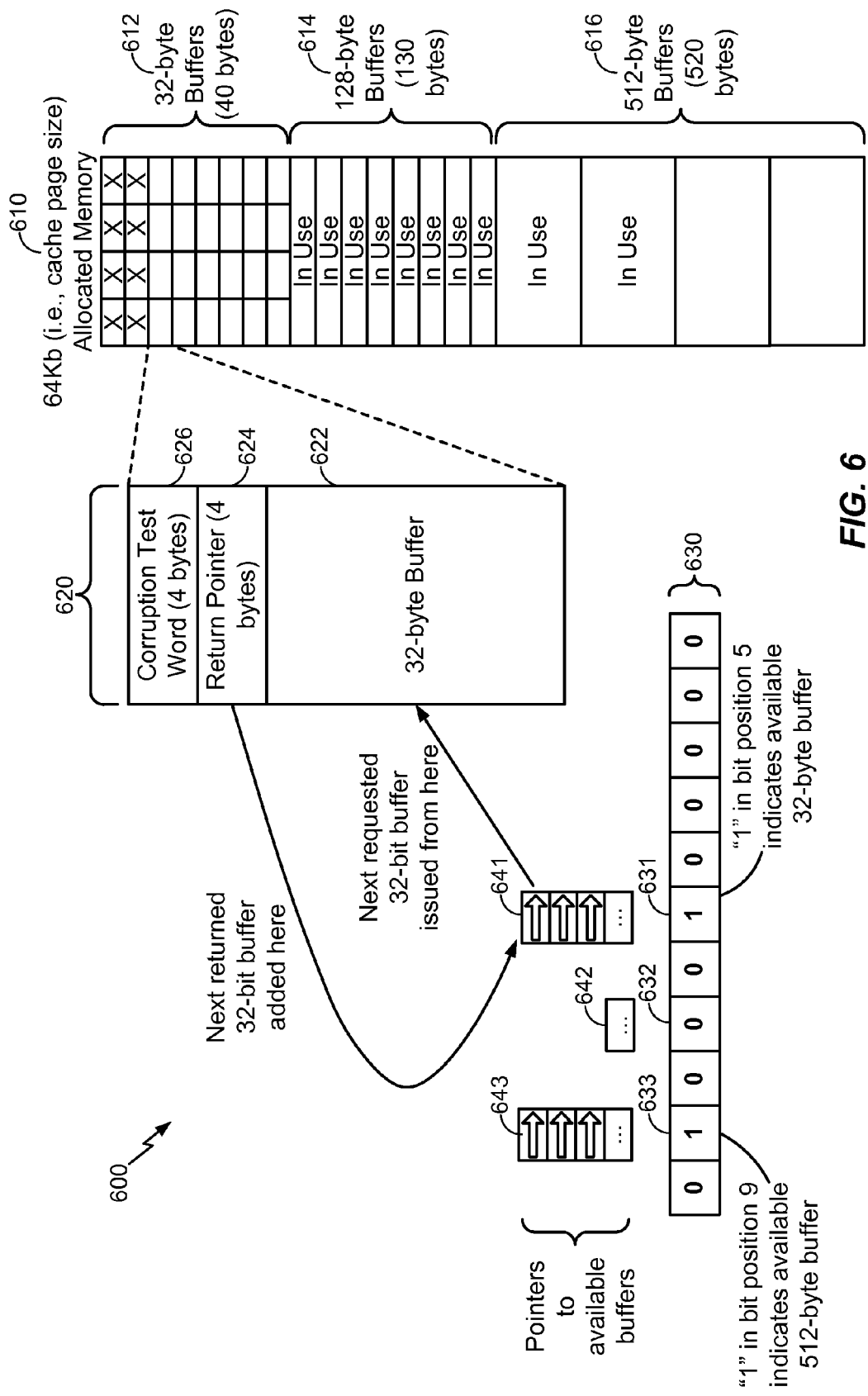
FIG. 6 is a diagram to illustrate a particular embodiment of dynamic memory management that can be used at the systems of FIGS. 1-5.

The technique 600 is illustrated as applied to a low-power audio decoding and playback use case, where a region 610 of memory is to be allocated. The allocated region 610 may be aligned and sized to correspond to a single page of a multi-way cache. For example, the allocated region may be 64 kb and may be aligned so it can be loaded into a single 64 kb page of a 256 kb 4-way cache. The allocated region 610 may then be partitioned into a plurality of predetermined buffers. For example, the allocated region 610 may be partitioned into 32-byte buffers 612, 128-byte buffers 614, and 512-byte buffers 616, as illustrated in FIG. 6. A data structure (e.g., a stack or queue) may be populated for each buffer size, where each data structure stores pointers to available buffers of the buffer size. For example, data structures 641, 642, and 643 may be populated to correspond to the buffers 612, 614, and 616 respectively.

A bitmask 630 may be created to indicate whether a predetermined buffer large enough to satisfy a requested buffer size is available. Each bit position of the bit mask may correspond to a particular buffer size and a value in the bit position may indicate whether a buffer of the particular buffer size is available in the allocated region 610. In the illustration of FIG. 6, unavailable buffers are designated with an "X" or with "In Use."

In the particular embodiment of FIG. 6, a first bit position of the bit mask 630 corresponds to buffers of $2^0$ bytes (i.e., 1-byte) and the value "0" in the first bit position indicates that no 1-byte buffers are available in the allocated region 610. A fifth bit position 631 corresponds to buffers of $2^5$ bytes (i.e., 32-bytes) and the value "1" indicates that a 32-byte buffer is available in the allocated region 610 and that a pointer to the available 32-byte buffer exists in the data structure 641. A seventh bit position 632 corresponds to buffers of $2^7$ bytes (i.e., 128-bytes) and the value "0" indicates that no 128-byte buffers are available in the allocated region 610 (i.e., since all 128-byte buffers in the allocated region 610 are "In Use"). A ninth bit position 633 corresponds to buffers of $2^9$ bytes (i.e., 512-bytes) and the value "1" indicates that a 512-byte buffer is available in the allocated region 610 and that a pointer the available 512-byte buffer exists in the data structure 643.

In a particular embodiment, each predetermined buffer has a size in accordance with the formula size=$2^n$+8 bytes, where n is an integer greater than equal to one. The extra 8 bytes may represent a corruption test word and a return pointer used during deallocation, as described below. Thus, the 32-byte buffers 612 may actually occupy 40 bytes, the 128-byte buffers may actually occupy 130 bytes, and the 512-byte buffers 616 may actually occupy 520 bytes.

In operation, the allocated region 610 may be cached at a multi-way cache and may enable access by one or more audio decoders executing at a processor to enable audio decoding, where all dynamic memory allocation requests corresponding to the audio decoding are fulfilled from the allocated region 610. That is, no cache misses due to dynamic memory allocation may be generated by the audio decoding.

When a request for a buffer of a particular requested size is received, the bitmask 630 may be examined to determine whether a buffer large enough to accommodate the requested size is available. For example, if a 32-byte buffer is requested, the bit mask 630 may be examined to check whether any buffers greater than or equal to 32-bytes in size are available. In a particular embodiment, a single leading/trailing zeroes DSP command that is executable in constant time is used to examine the bit mask 630, the requested buffer size, or both. For example, the "1" at the fifth bit position 630 indicates that a 32-byte buffer is available to satisfy the request. A pointer from data structure 641 may be provided (and removed from the data structure 641) to satisfy the dynamic memory allocation request. When a provided pointer is a last remaining pointer of a data structure, the corresponding value of the bit mask 630 may be set to "0." Providing the pointer and setting the bit mask value may also be performed in constant time (e.g., using a stack/queue "pop" operation and a write command).

For example, a pointer to a representative buffer 620 may be provided. The buffer 620 may include a 32-byte buffer 622, a four-byte corruption test word 626, and a four-byte return pointer 624. When a request is received to deallocate the buffer 620, the corruption test word 626 may be evaluated. If the corruption test word 626 (e.g., a pseudorandom 32-bit value) has been modified, the buffer 620 may be determined to be corrupt (e.g., due to being improperly overwritten by data that has crossed a buffer boundary), and an error may be returned. When the corruption test word 626 is determined to be unchanged, the buffer 620 may be deallocated. Deallocating the buffer 620 may include placing a pointer to the buffer 620 in the data structure 641 identified by the return pointer 624 of the buffer 620. Deallocating the buffer 620 may also include setting the corresponding value of the bit mask 630 to "1." Placing the pointer in the data structure and setting the bit mask value may be performed in constant time (e.g., using a stack/queue "push" operation and a write command).

It will be appreciated that the technique 600 of FIG. 6 may provide constant time allocation and deallocation of dynamic memory. That is, the technique 600 of FIG. 6 may operate independently of a size of the allocated region 610, and may therefore apply to dynamic memory allocation in spaces larger than a cache. In illustrative embodiments, the technique 600 of FIG. 6 may be implemented as memory management software that may be leveraged by other software developers. For example, the technique 600 of FIG. 6 may be implemented using one or more header and source files (e.g., C or C++ files) and may be used in place of existing dynamic memory management techniques (e.g., malloc( ) and free( )). It will also be appreciated that by "pushing" and "popping" from the same side of the data structures 641-643, the technique 600 of FIG. 6 may re-use buffers to the extent possible, thereby reducing an overall footprint size of dynamically allocated memory.

Figure 7:
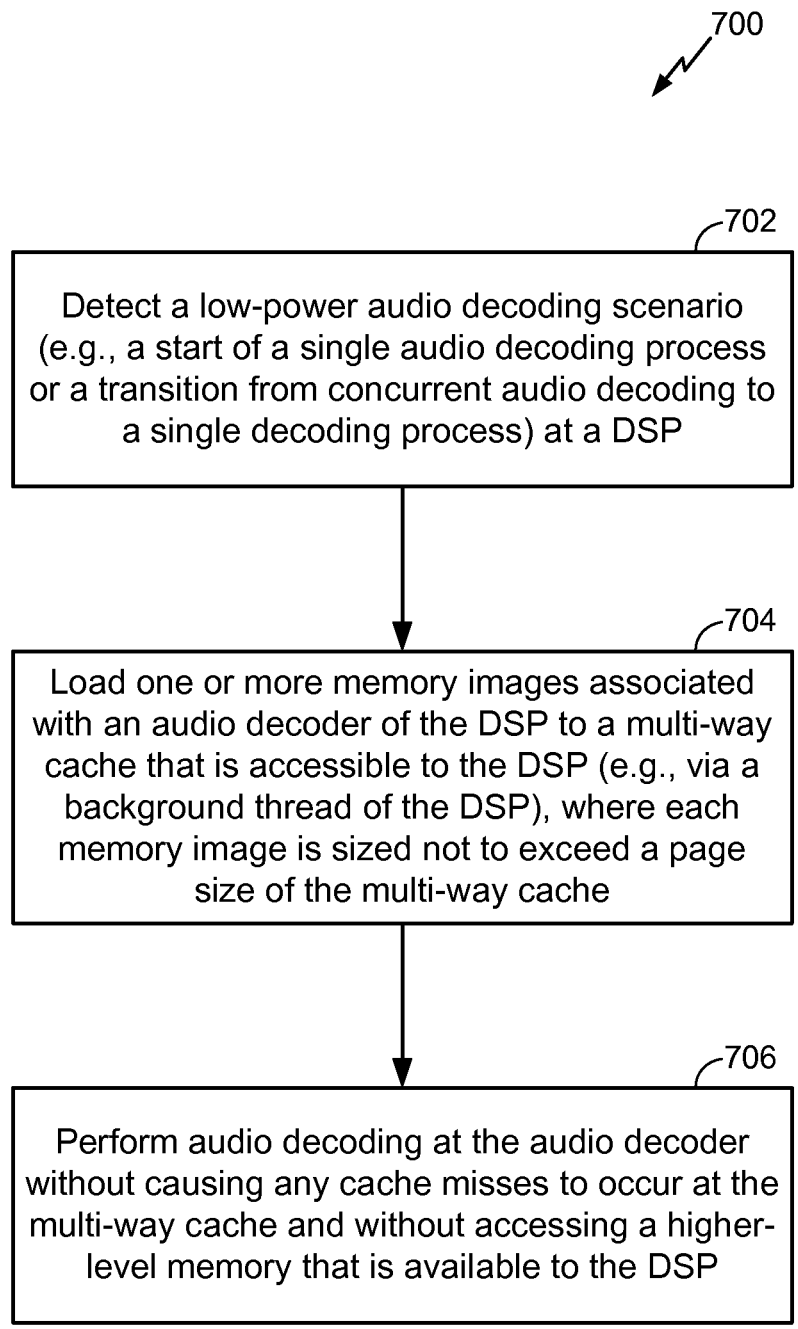
FIG. 7 is a flow diagram to illustrate a particular embodiment of a method of performing low-power audio decoding and playback using cached images.

FIG. 7 is a flow diagram to illustrate a particular embodiment of a method 700 of performing low-power audio decoding and playback using cached images. In an illustrative embodiment, the method 700 may be performed at the system 100 of FIG. 1, the system 200 of FIG. 2, the system 300 of FIG. 3, the system 400 of FIG. 4, or the system 500 of FIG. 5.

The method 700 may include detecting a low-power audio decoding scenario at a DSP, at 702. The low-power audio decoding scenario may correspond to a start of a single audio decoding process or a transition from concurrent audio decoding to a single decoding process. For example, a low-power audio decoding scenario may be detected based on the start of the MP3 stream stored at the LPM 440 of FIG. 4. Alternately, the low-power audio decoding scenario may be detected based on the first transition 230 of FIG. 2 or the transition 330 of FIG. 3.

The method 700 may also include loading one or more memory images associated with an audio decoder of the DSP to a multi-way cache, at 704. The multi-way cache is accessible to the DSP and each memory image is sized not to exceed a page size of the multi-way cache. For example, in FIG. 4, the memory images 213, 214, and 215 may be loaded to the 4-way cache 210 that is accessible to the DSP 430. The memory images 213, 214, and 215 may be sized not to exceed the page size of the 4-way cache 210 and may correspond to the audio decoder 454. While the memory images 213, 214, and 215 are loaded to the 4-way cache 210 (e.g., by the background thread 240), audio decoding may proceed at the audio decoder with a decreasing number of cache misses. For example, the number of cache misses may decrease as illustrated and described with reference to the first curve 298 of FIG. 2.

The method 700 may further include performing audio decoding at the audio decoder without causing any cache misses to occur at the multi-way cache and without accessing a higher-level memory that is available to the DSP, at 706. For example, in FIG. 4, the audio decoder 454 may decode the MP3 stream without causing cache misses to occur at the 4-way cache 210 and without accessing the RAM 420. To illustrate, when each of the memory images 213, 214, and 215 has been loaded to the 4-way cache 210 by the background thread 240, the number of cache misses may drop to zero, as illustrated and described with reference to the first curve 298 of FIG. 2.

In other embodiments, the method 700 includes loading one or more memory images associated with an audio decoder to a multi-way cache that is accessible to a processor, where each of the one or more memory images is sized not to exceed a page size of the multi-way cache. The multi-way cache may include a 4-way cache and the processor may include a digital signal processor. Loading the one or more memory image may enable audio decoding without the audio decoder causing any cache misses to occur at the multi-way cache, where the audio decoding is performed after loading the one or more memory images into the multi-way cache without accessing a higher-level memory that is available to the processor. The size of each memory image may be equal to the page size of the multi-way cache, and the audio decoder may be operable to decode one or more audio streams. The one or more memory images may each be loaded from a memory to the multi-way cache and may each be aligned in the memory to be loaded into a corresponding single page of the multi-way cache. The memory may also include a dynamic memory allocation region and one or more memory images associated with a second audio decoder, including at least one memory image that is common to a plurality of audio decoders. The method 700 may include accessing, at a memory integrated with the processor, program instructions that are common to multiple audio decoders.

The one or more memory images may include three or more memory images. A first memory image of the three or more memory images may include audio decoder program instructions, a second memory image of the three or more memory images may correspond to a dynamic memory allocation region, and a third memory image of the three or more memory images may include post-processing program instructions. The method 700 may include initiating a process to cause loading of an entire memory image of the one or more memory images into the multi-way cache. The process may include a background thread and may be initiated in response to detecting a start or a stop of an audio decoding process.

In additional embodiments, the method 700 may include concurrently decoding a first audio stream at the audio decoder and a second audio stream at a second audio decoder. Termination of the second audio stream may be detected, and decoding of the second audio stream at the second decoder may be terminated. The first audio stream may be decoded at the audio decoder after terminating the decoding of the second audio stream. The one or more memory images may be loaded to the multi-way cache without an audible interruption in the first or second audio streams and independently of intervention from an application processor. In further embodiments, the method 700 may include decoding a first audio stream at the audio decoder without the audio decoder causing any cache misses to occur at the multi-way cache. Termination of the first audio stream and initiation of a second audio stream to be decoded by a second audio decoder may be detected, and one or more memory images associated with the second audio decoder may be loaded to the multi-way cache. The second audio stream may be decoded at the second audio decoder without the second audio decoder causing any cache misses to occur at the multi-way cache. The one or more memory images associated with the second audio decoder may be loaded to the multi-way cache without an audible interruption in the first or second audio streams and independently of intervention from an application processor.

In other embodiments, the method 700 may include receiving audio data, where the one or more memory images are loaded in response to determining that the audio data corresponds to the audio decoder, decoding the audio data at the audio decoder without causing a cache miss to occur at the multi-way cache, applying one or more post-processing functions to the decoded audio data to generate post-processed audio data, applying one or more common processing functions to the post-processed data to generate processed audio data, and providing the processed audio data to an output port of the processor. The one or more post-processing functions may be specific to the audio decoder and the one or more common processing functions may be common to a plurality of audio decoders.

The method 700 of FIG. 7 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 700 of FIG. 7 can be performed by a processor that executes instructions, as described with respect to FIG. 9.

Figure 8:
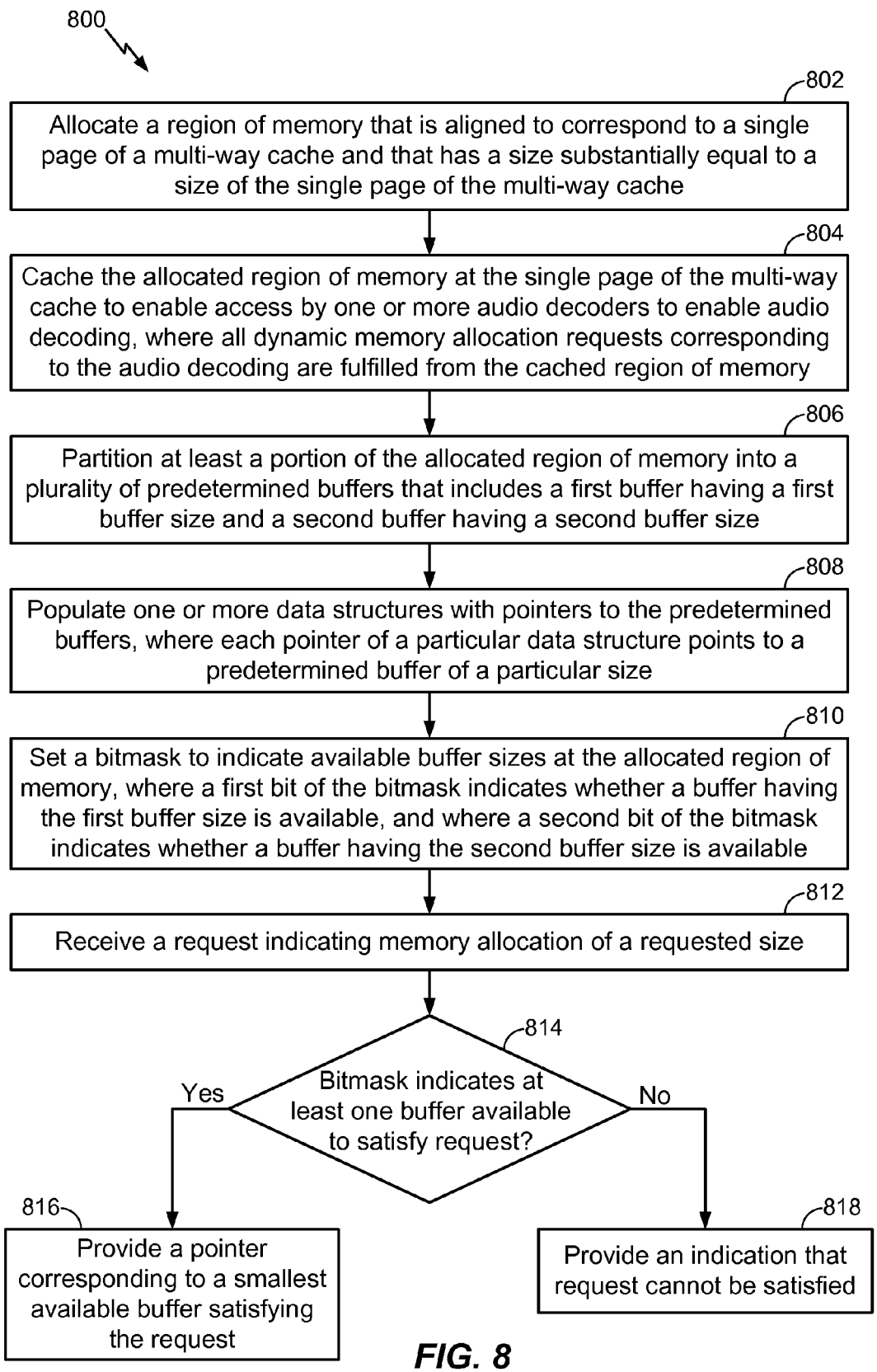
FIG. 8 is a flow diagram to illustrate a particular embodiment of a method of dynamic memory management during low-power audio decoding and playback using cached images.

FIG. 8 is a flow diagram to illustrate a particular embodiment of a method 800 of dynamic memory management during low-power audio decoding and playback using cached images. In an illustrative embodiment, the method 800 may be illustrated with reference to the technique 600 of FIG. 6.

The method 800 may include allocating a region of memory, at 802. The allocated region is aligned to correspond to a single page of a multi-way cache and has a size substantially equal to a size of the single page of the multi-way cache. For example, referring to FIG. 6, the region 610 may be allocated, where the region 610 has a size (64 kb) equal to a page size of a multi-way cache (e.g., a page size of the 256 kb cache 570 of FIG. 5).

The method 800 may also include caching the allocated region of memory at the single page of the multi-way cache to enable access by one or more audio decoders to enable audio decoding, at 804. All dynamic memory allocation requests corresponding to the audio decoding may be fulfilled from the cached region of memory. For example, referring to FIG. 6, the allocated region 610 may be cached to enable low-power audio decoding.

The method 800 may further include partitioning at least a portion of the allocated region of memory into a plurality of predetermined buffers that includes a first buffer having a first buffer size and a second buffer having a second buffer size, at 806. For example, referring to FIG. 6, the allocated region 610 may be partitioned into the 32-byte buffers 612, the 128-byte buffers 614, and the 512-byte buffers 616.

The method 800 may include populating one or more data structures with pointers to the predetermined buffers, at 808. Each pointer of a particular data structure points to a predetermined buffer of a particular size. For example, referring to FIG. 6, the data structures 641, 642, and 643 may be populated.

The method 800 may also include setting a bitmask to indicate available buffers at the allocated region of memory, at 810. A first bit of the bitmask may indicate whether a buffer having the first buffer size is available and a second bit of the bitmask may indicate whether a buffer having the second buffer size is available. For example, referring to FIG. 6, the bit mask 630 may be set.

The method 800 may further include receiving a request indicating memory allocation of a requested size, at 812. For example, referring to FIG. 6, a request for a 32-byte buffer may be received. The method 800 may include determining whether the bitmask indicates that at least one buffer is available to satisfy the request, at 814. When the bitmask indicates that at least one buffer is available, the method 816 may include providing a pointer corresponding to a smallest available buffer satisfying the request, at 816. For example, referring to FIG. 6, a pointer to the buffer 620 may be provided. When it is determined that no buffer large enough to satisfy the request exists, the method 800 may include providing an indication that the request cannot be satisfied, at 818.

The method 800 of FIG. 8 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 800 of FIG. 8 can be performed by a processor that executes instructions, as described with respect to FIG. 9.

Figure 9:
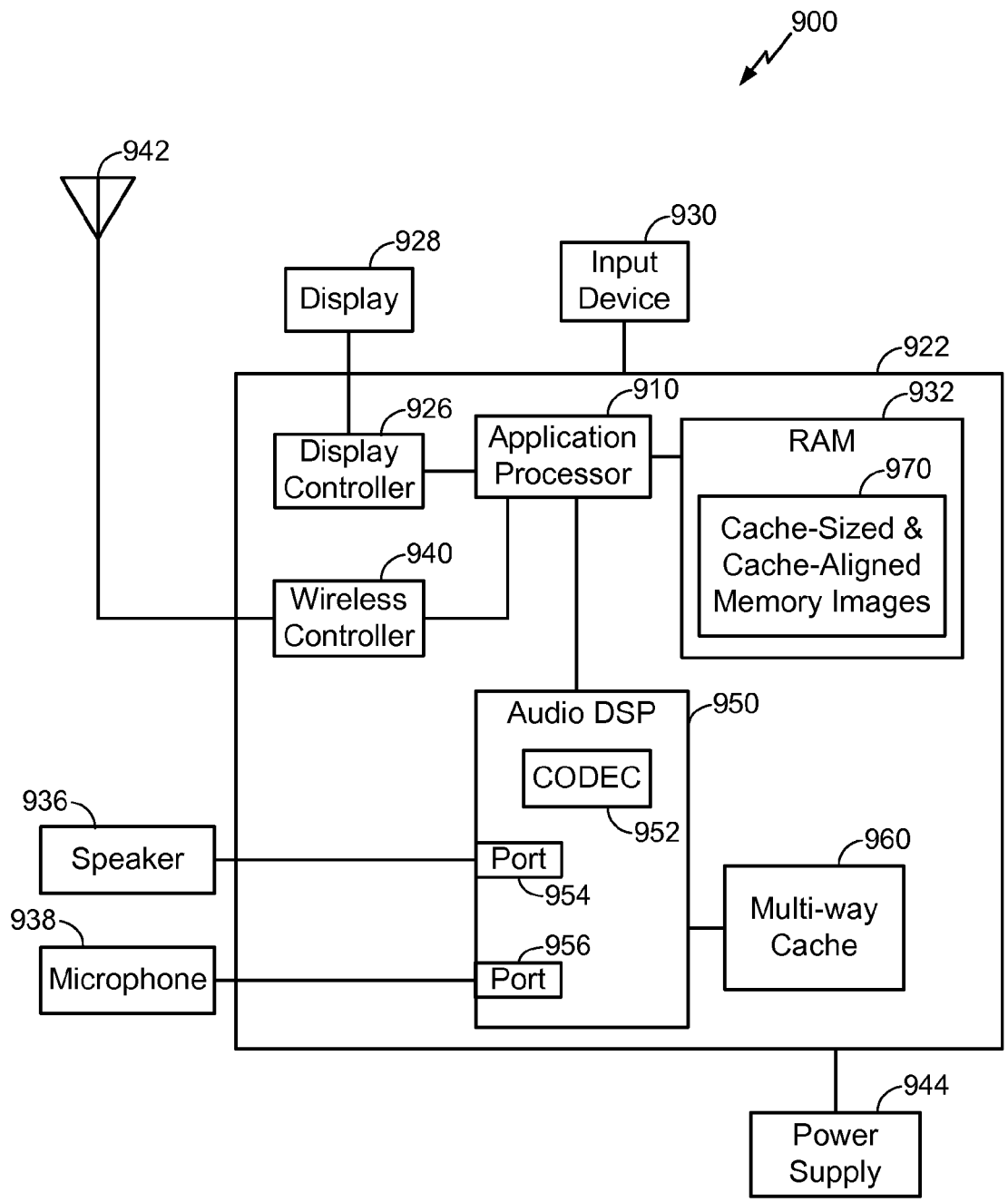
FIG. 9 is a diagram to illustrate a particular embodiment of an electronic device that is capable of performing low-power audio decoding and playback using cached images.

Referring to FIG. 9, a diagram of a particular embodiment of an electronic device is depicted and generally designated 900. The device 900 includes one or more processors, such as an application processor 910 and an audio digital signal processor (DSP) 950. The application processor 910 and the audio DSP 950 may include hardware configured to perform the methods disclosed herein. The application processor 910 and the audio DSP 950 may also be operable to execute software instructions that are executable to perform the methods disclosed herein. The application processor 910 is coupled to a random access memory (RAM) 932. The RAM includes one or more cache-sized and cache-aligned memory images 970 that are cacheable to enable low-power decoding and playback of audio streams. In an illustrative embodiment, the memory images 970 may correspond to the memory images 142-146 of FIG. 1, the memory images 211-218 of FIG. 2, or the allocated region 610 of FIG. 6.

FIG. 9 also shows a display controller 926 that is coupled to the application processor 910 and to a display 928. The audio DSP 950 may include a coder/decoder (CODEC) 952 and one or more ports (e.g., illustrative ports 954 and 956). A speaker 936 and a microphone 938 can be coupled to the audio DSP 950 via the ports 954 and 956, respectively. In an illustrative embodiment, the CODEC 952 includes the audio decoding block 122 of FIG. 1 or one or more components of the DSP 430 of FIG. 4, such as the decoders 454, 454, and 456. In another illustrative embodiment, the ports 954 and 956 are each one of the output ports 492, 494, and 496 of FIG. 4. The audio DSP 950 may also include or be coupled to a multi-way cache 960 operable to cache the memory images 970. In an illustrative embodiment, the multi-way cache 960 is the multi-way cache 130 of FIG. 1, the 4-way cache 210 of FIG. 2, or the cache 570 of FIG. 5.

FIG. 9 also indicates that a wireless controller 940 can be coupled to the application processor 910 and to a wireless antenna 942. In a particular embodiment, the application processor 910, the audio DSP 950, the multi-way cache 960, the display controller 926, the RAM 932, and the wireless controller 940 are included in a system-in-package or system-on-chip device 922. In a particular embodiment, an input device 930 (e.g., a keyboard or touchscreen) and a power supply 944 (e.g., a battery) are coupled to the system-on-chip device 922. Moreover, in a particular embodiment, as illustrated in FIG. 9, the display 928, the input device 930, the speaker 936, the microphone 938, the wireless antenna 942, and the power supply 944 are external to the system-on-chip device 922. However, each of the display 928, the input device 930, the speaker 936, the microphone 938, the wireless antenna 942, and the power supply 944 can be coupled to a component of the system-on-chip device 922, such as an interface or a controller.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a non-transitory storage medium such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    allocating one or more memory regions of a memory that is accessible to a processor, wherein the one or more memory regions are each allocated to a particular memory image of one or more memory images associated with a first audio decoder;
    loading the one or more memory images to a multi-way cache;
    decoding a first audio stream at the first audio decoder and a second audio stream at a second audio decoder;
    terminating the decoding of the second audio stream at the second audio decoder; and
    decoding the first audio stream at the first audio decoder after terminating the decoding of the second audio stream.

2. The method of claim 1, wherein a size of each of the one or more memory images is equal to a page size of the multi-way cache.

3. The method of claim 1, wherein the first audio decoder is operable to decode one or more audio streams.

4. The method of claim 1, further comprising detecting a termination of the second audio stream.

5. The method of claim 1, wherein the one or more memory images includes three or more memory images, wherein a first memory image of the one or more memory images includes audio decoder program instructions, wherein a second memory image of the one or more memory images corresponds to a dynamic memory allocation region, and wherein a third memory image of the one or more memory images includes post-processing program instructions.

6. The method of claim 1, wherein the one or more memory images are loaded to the multi-way cache independently of intervention from an application processor.

7. The method of claim 1, further comprising accessing, at a third memory integrated with the processor, program instructions that are common to multiple audio decoders.

8. The method of claim 1, wherein the processor comprises a digital signal processor.

9. The method of claim 1, wherein a first memory image of the one or more memory images is configured to be used for audio decoding in a low power mode of the processor and in a non-low power mode of the processor.

10. The method of claim 1, wherein the memory is a random access memory.

11. The method of claim 1, further comprising decoding the first audio stream at the first audio decoder without the first audio decoder causing a cache miss to occur at the multi-way cache.

12. The method of claim 11, further comprising decoding a third audio stream at a third audio decoder without the third audio decoder causing cache misses to occur at the multi-way cache.

13. The method of claim 1, further comprising:
    receiving audio data;
    wherein the one or more memory images are loaded in response to determining that the audio data corresponds to the first audio decoder;
    decoding the audio data at the first audio decoder without causing a cache miss to occur at the multi-way cache; and
    providing processed audio data to an output port of the processor.

14. The method of claim 13, further comprising:
    applying one or more post-processing functions to decoded audio data to generate post-processed audio data, wherein the one or more post-processing functions are specific to the first audio decoder; and
    applying one or more common processing functions to the post-processed audio data to generate the processed audio data, wherein the one or more common processing functions are common to a plurality of audio decoders.

15. The method of claim 1, wherein a size of each of the one or more regions of memory is less than or equal to a page size of the multi-way cache, and wherein loading the one or more memory images to the multi-way cache enables audio decoding without the first audio decoder causing cache misses to occur at the multi-way cache.

16. The method of claim 15, wherein the audio decoding is performed after loading the one or more memory images to the multi-way cache without accessing a higher-level memory that is available to the processor, and wherein the first audio stream and the second audio stream are decoded concurrently.

17. The method of claim 1, further comprising initiating a process to cause loading of an entire memory image of the one or more memory images into the multi-way cache.

18. The method of claim 17, wherein the process comprises a background thread of the processor.

19. The method of claim 17, wherein the process is initiated in response to detecting a start or a stop of an audio decoding process.

20. The method of claim 1, further comprising applying one or more post-processing functions to decoded audio data to generate post-processed audio data, wherein the one or more post-processing functions are specific to the first audio decoder.

21. The method of claim 20, further comprising applying one or more common processing operations to the post-processed audio data to generate processed audio data, wherein the one or more common processing operations are common to some of the audio decoders.

22. The method of claim 1, wherein the one or more memory images are loaded to the multi-way cache without an audible interruption in the first audio stream or in the second audio stream.

23. The method of claim 1, further comprising:
decoding the first audio stream at the first audio decoder without the first audio decoder causing a cache miss to occur at the multi-way cache;
detecting a termination of the first audio stream and an initiation of a third audio stream to be decoded by a third audio decoder;
loading one or more memory images associated with the third audio decoder to the multi-way cache; and
decoding the third audio stream at the third audio decoder without the third audio decoder causing cache misses to occur at the multi-way cache.

24. The method of claim 23, wherein the one or more memory images associated with the third audio decoder are loaded to the multi-way cache without an audible interruption in the first audio stream or in the third audio stream.

25. The method of claim 23, wherein the one or more memory images associated with the third audio decoder are loaded to the multi-way cache independently of intervention from an application processor.

26. The method of claim 1, wherein the one or more memory images are each loaded from the memory to the multi-way cache and wherein the one or more memory images are each aligned in the memory to be loaded into a corresponding single page of the multi-way cache.

27. The method of claim 26, wherein the one or more memory images in the memory are accessible to enable audio decoding and low-power audio decoding when all of the one or more memory images are loaded into the multi-way cache.

28. The method of claim 26, wherein the memory includes one or more memory images associated with the second audio decoder.

29. The method of claim 26, wherein the memory includes at least one memory image that is common to a plurality of audio decoders.

30. The method of claim 26, wherein the memory includes a dynamic memory allocation region.

31. A non-transitory computer-readable storage medium comprising instructions that, when executed by a processor, cause the processor to:
allocate one or more memory regions of a memory that is accessible to the processor, wherein the one or more memory regions are each allocated to a particular memory image of one or more memory images associated with a first audio decoder;
load the one or more memory images to a multi-way cache;
decode a first audio stream at the first audio decoder and a second audio stream at a second audio decoder;
terminate the decoding of the second audio stream at the second audio decoder; and
decode the first audio stream at the first audio decoder after terminating the decoding of the second audio stream.

32. The non-transitory computer-readable storage medium of claim 31, wherein loading the one or more memory images to the multi-way cache enables audio decoding without the first audio decoder causing any cache misses to occur at the multi-way cache.

33. The non-transitory computer-readable storage medium of claim 31, wherein a size of each of the one or more memory images is equal to a page size of the multi-way cache.

34. The non-transitory computer-readable storage medium of claim 31, wherein a size of each of the one or more regions of memory is less than or equal to a page size of the multi-way cache.

35. An electronic device, comprising:
a processor; and
a multi-way cache accessible to the processor,
wherein the processor is configured to:
allocate one or more memory regions of a memory, wherein the one or more memory regions are each allocated to a particular memory image of one or more memory images associated with a first audio decoder;
load the one or more memory images associated with an audio decoder into the multi-way cache;
terminate the decoding of the second audio stream at the second audio decoder; and
decode the first audio stream at the first audio decoder after terminating the decoding of the second audio stream.

36. The electronic device of claim 35, wherein a size of each of the one or more regions of memory is less than or equal to a page size of the multi-way cache.

37. The electronic device of claim 35, further comprising common processing circuitry configured to apply one or more common processing operations to post-processed audio data to generate processed audio data, wherein the one or more common processing operations are common to a plurality of audio decoders.

38. The electronic device of claim 35, wherein loading the one or more memory images into the multi-way cache enables audio decoding without the first audio decoder causing cache misses to occur at the multi-way cache.

39. The electronic device of claim 35, wherein the memory is a random access memory and further comprising:
a low-power memory accessible to the processor; an application processor configured to cause audio data to be retrieved from the random access memory and stored at the low-power memory, wherein the audio decoder is configured to decode audio data retrieved from the low-power memory to generate decoded audio data;
post-processing circuitry configured to apply one or more post-processing operations to the decoded audio data to generate post-processed audio data, wherein the one or more post-processing operations are specific to the audio decoder; and common processing circuitry configured to apply one or more common processing operations to the post-processed audio data to generate the processed audio data, wherein the one or more common processing operations are common to a plurality of audio decoders; and an output port configured to output the processed audio data.

40. An apparatus, comprising:

means for processing data; and means for caching data in a plurality of cache ways, wherein the means for caching data is accessible to the means for processing data, and wherein the means for processing data is configured to:

allocate one or more memory regions of means for storing data, wherein the one or more memory regions are each allocated to a particular memory image of one or more memory images associated with first means for decoding audio data;

load the one or more memory images associated with an audio decoder into the means for caching data;

decode a first audio stream at the first means for decoding audio data and a second audio stream at a second means for decoding audio data;

terminate the decoding of the second audio stream at the second means for decoding audio data; and decode the first audio stream at the first means for decoding audio data after terminating the decoding of the second audio stream.

41. The apparatus of claim 40, wherein loading the one or more memory images to the means for caching data enables audio decoding without the means for decoding audio data causing cache misses to occur at the means for caching data.

42. The apparatus of claim 40, wherein a size of each of the one or more memory images is equal to a page size of the means for caching data.

43. The apparatus of claim 40, wherein the means for decoding audio data is an Advanced Audio Coding (AAC)-type audio decoder, a Moving Picture Experts Group Audio Layer III (MP3)-type audio decoder, a speech audio decoder, a pulse-code modulation (PCM) audio decoder, or any combination thereof.

44. The apparatus of claim 40, further comprising means for applying one or more post-processing operations to decoded audio data to generate post-processed audio data, wherein the one or more post-processing operations are specific to the first audio decoder.

* * * * *